United States Patent [19]

Talarmo et al.

[11] Patent Number: 5,778,318
[45] Date of Patent: Jul. 7, 1998

[54] METHOD FOR ALLOCATING CHANNELS IN A RADIO SYSTEM

[75] Inventors: Reino Talarmo, Riihimäki; Mika Lehmusto, Espoo, both of Finland

[73] Assignee: Nokia Telecommunications Oy, Espoo, Finland

[21] Appl. No.: 676,235

[22] PCT Filed: Jan. 13, 1995

[86] PCT No.: PCT/FI95/00009

§ 371 Date: Sep. 18, 1996

§ 102(e) Date: Sep. 18, 1996

[87] PCT Pub. No.: WO95/19687

PCT Pub. Date: Jul. 20, 1995

[30] Foreign Application Priority Data

Jan. 14, 1994 [FI] Finland .................. 940196

[51] Int. Cl.⁶ .................................. H04Q 7/00
[52] U.S. Cl. .................. 455/452; 370/341; 455/511
[58] Field of Search ............... 455/34.1, 34.2, 455/33.1, 54.1, 56.1, 450, 452, 509, 511; 370/327, 340, 341

[56] References Cited

U.S. PATENT DOCUMENTS

| | | | |
|---|---|---|---|
| 5,235,598 | 8/1993 | Sasuta | 455/34.1 |
| 5,239,678 | 8/1993 | Grube et al. | 455/34.1 |
| 5,377,193 | 12/1994 | Grube et al. | 370/327 X |
| 5,442,809 | 8/1995 | Diaz et al. | 455/54.1 |
| 5,483,667 | 1/1996 | Faruque | 455/34.1 X |
| 5,504,803 | 4/1996 | Yamada et al. | 455/34.1 X |

FOREIGN PATENT DOCUMENTS

| | | | |
|---|---|---|---|
| 0 440 436 | 7/1991 | European Pat. Off. | H04Q 7/04 |
| 0 529 859 | 3/1993 | European Pat. Off. | H04Q 7/04 |
| 33 34 886 | 8/1995 | Germany | H04Q 7/38 |
| WO 88/08648 | 11/1988 | WIPO | H04B 7/14 |
| WO 92/08324 | 5/1992 | WIPO | H04Q 7/00 |
| WO 93/10600 | 5/1993 | WIPO | H04B 7/00 |
| WO 93/10602 | 5/1993 | WIPO | H04Q 7/38 |

OTHER PUBLICATIONS

Patent Abstracts of Japan, vol. 6, No. 81, E-107, Abstract of JP 57-17246 (A), Jan. 1982.

*Primary Examiner*—Thomas Mullen
*Attorney, Agent, or Firm*—IP Group of Pillsbury Madison & Sutro LLP

[57] ABSTRACT

A method for allocating control channels in a radio system having base stations and subscriber stations communicating with respective ones of the base stations on control and traffic channels. To make the control channel operation more efficient and to avoid interference, traffic channels are allocated for control channel use so as to distribute the control channel operation between a greater number of channels, the channels allocated for control channel use being indicated to the subscriber stations and control channel operation is performed on the control channels allocated in a distributed manner.

16 Claims, 5 Drawing Sheets

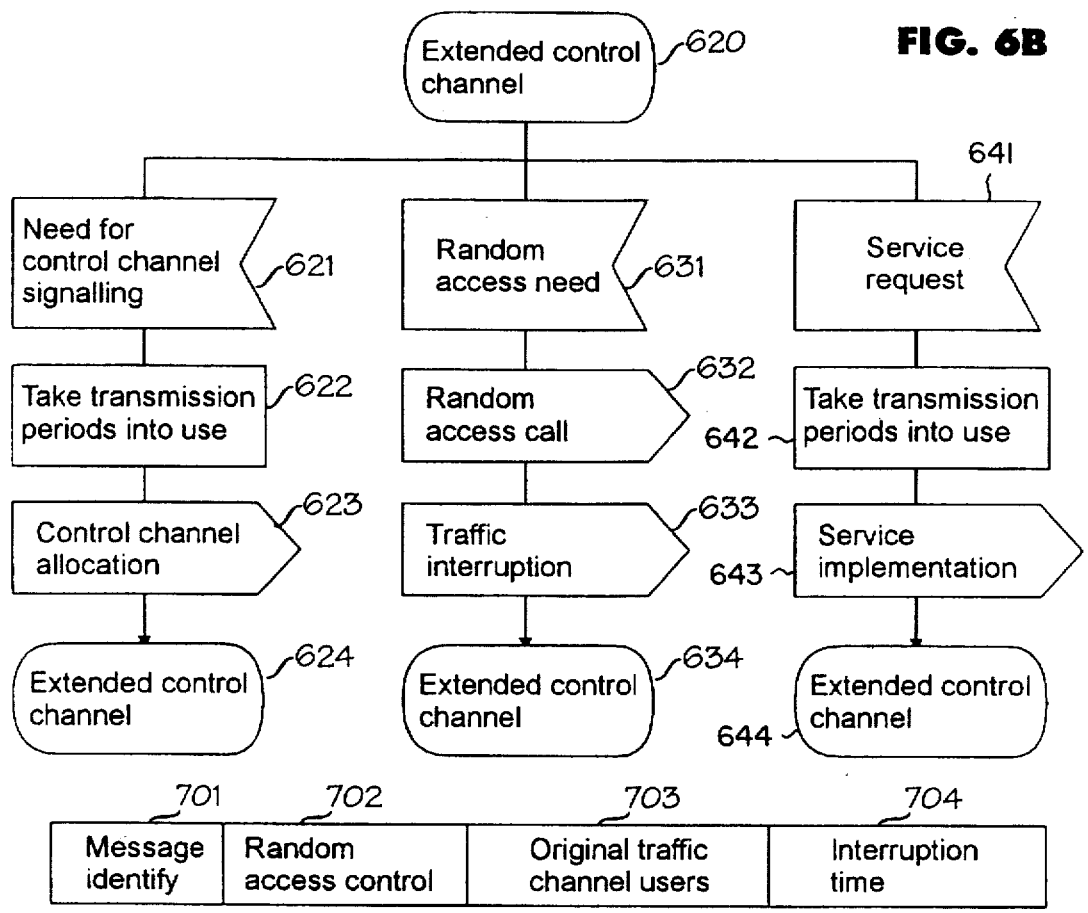
FIG. 6B
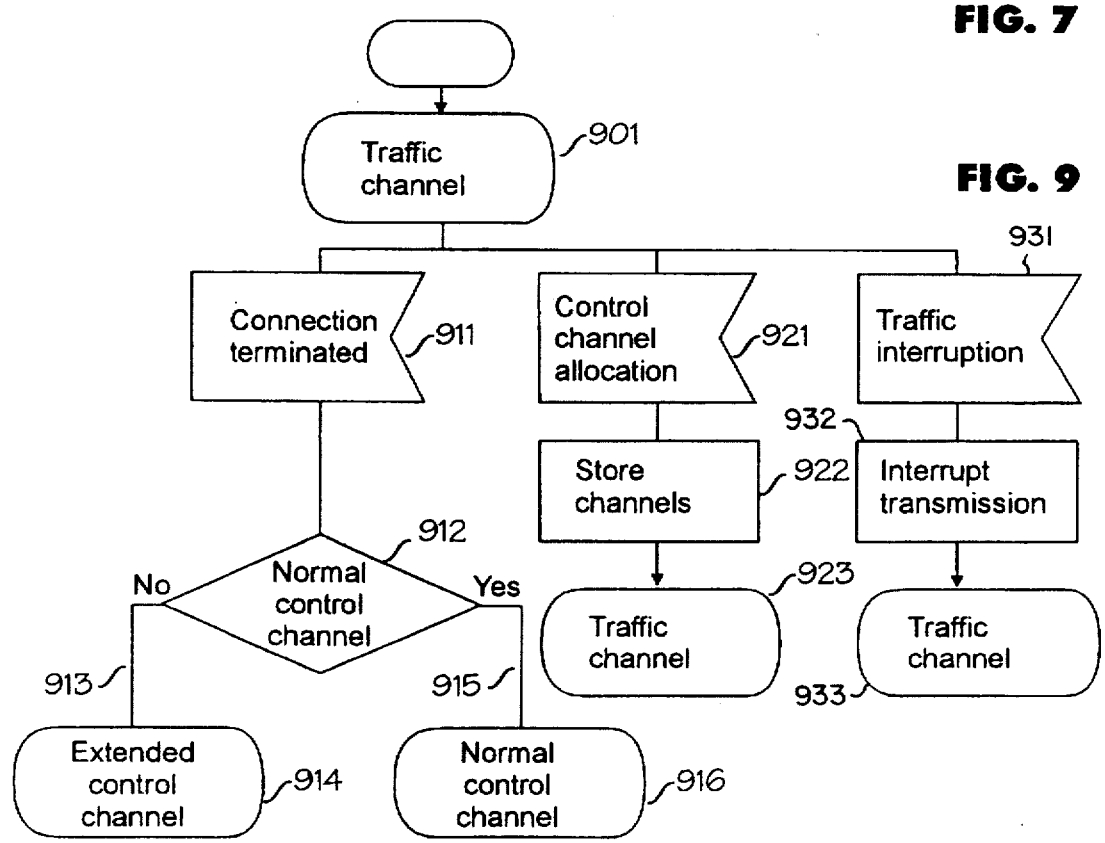
FIG. 7
FIG. 9

5,778,318

1

METHOD FOR ALLOCATING CHANNELS IN A RADIO SYSTEM

This application claims benefit of international application PCT/FI95/00009, filed Jan. 13, 1995.

BACKGROUND OF THE DISCLOSURE

The invention relates to a method for allocating channels in a radio system comprising base stations and subscriber stations communicating with the base stations over control and traffic channels.

A typical feature of trunking radio telephone systems is that the number of radio channels allocated to such radio systems has very often been too small in relation to the need. One base station typically has only 1 to 4 radio channels available, one of them is typically allocated for control channel use, and the others are traffic channels. If the traffic density is high within the area of the base station, it is easy to notice that the capacity of the control channels of the base station is too low at congestion hours. This becomes apparent in that there are not enough control and traffic channels for subscribers requesting them, that is, traffic congestion occurs. Traffic congestion appears particularly on the uplink channel of the control channel of the base station, i.e. on the channel over which subscriber stations try to establish a connection to the base station. On this control channel the radio telephones select the time of transmission on some kind of random access principle. In the random access method known from the prior art, only a predetermined proportion of the total capacity, possibly only 30%, can be used successfully in the uplink direction due to collisions between signalling messages. This indicates that the uplink direction of the control channel often forms a bottle-neck on the control channel.

It is also widely known that interferences occur in radio systems. Interferences occur, e.g. when radio transmitters operating on the same frequency or on frequencies too close to each other interfere with each other. In cellular radio networks, for instance, several base stations may use the same radio channel; normally, such base stations are so remote from each other that an individual radio station is able to communicate on the same frequency with one base station only. Under exceptional radio wave propagation conditions, however, a signal from an individual radio station may reach the receiver of the wrong base station, thus interfering with the normal radio traffic of the base station. This is particularly disastrous for the control channel operation, as the operation of normal traffic channels of the radio system is based on the control channel operation. Correspondingly, an individual radio telephone, i.e. subscriber station, may receive a signal from a base station which is normally out of range. Interfering with the desired traffic by a radio signal transmitted on the wrong frequency cannot be prevented by using identities, which only prevent responding to wrong impulses.

As used in this dowment, a channel refers to a single individual frequency or to a single time slot of a single individual frequency, that is, a single direction of transmission.

Furthermore, faults occur in radio systems as radio devices may operate contrary to the protocol used in the network, e.g. in the case of a failure when a radio keeps transmitting on a control channel or in a control channel time slot more or less continuously. A similar interference situation may also result from crosstalk between completely different radio systems. In some situations, the operation of a radio system may be interfered with intentionally by sending out interfering radio signalling particularly on the control channel.

The control channel operation of a mobile or fixed radio system can be interfered with intentionally at least in the following ways:

Over a wide band of the entire available frequency band in such a way that the interference affects the receiver of the control channel of the base station, i.e. the receiving frequency range of the base station is interfered with partially or entirely.

Over a wide band of the entire available frequency band in such a way that the interference affects the receivers of mobile or fixedly located radio subscribers, i.e. the transmitting frequency range of the base station is interfered with partially or entirely.

Over a narrow band in such a way that the interference affects the receiver of the control channel of the base station, i.e. the receiving frequency of the base station is interfered with.

Over a narrow band in such a way that the interference affects the receivers of mobile or fixedly mounted radio subscribers, i.e. the transmitting frequency of the base station is interfered with.

As is known, signalling interfering with the operation of the control channel can be evaded by changing the frequency of the control channel or in some cases by changing the control channel time slot only. The operating frequency of the control channel can be changed either by using an algorithm known to all subscriber stations or by indicating the new control channel frequency to all listening radio devices in advance before the change of frequency. It is also possible to the several control frequencies concurrently in the system, although the use of several frequencies in a low-capacity system is not always economically desirable.

A drawback of the prior art control channel allocation procedures is that they are inflexible. In the system, it is necessary to use a specific channel as a control channel, even though the capacity of this channel is not sufficient. At the same time, one of the traffic channels may have capacity that is not currently needed for traffic channel use.

A problem with prior art control channel changes caused by control channel interference or jamming is that when a single control channel is changed over to a single new control channel, the interferer of the control channel may follow this control channel change and start to transmit interfering signalling on the new control channel. Another problem with the prior art solutions is that the capacities of radio systems, trunking radio systems in particular, may be very limited, i.e. the systems have no capacity to allocate an empty channel for control channel use. Accordingly, when the control channel is changed over to a new channel already in use, e.g. a traffic channel, any traffic originally transmitted over that traffic channel has to be terminated and an ongoing call on the channel is interrupted and the subscribers that participated in the call have to make a new connection establishment request. This of course needlessly loads the system, particularly its control channel and connection establishment procedures.

SUMMARY OF THE INVENTION

The object of the present invention is to eliminate the above-described problems of the prior art.

An object of the invention is to allow the signalling capacity to be increased in a situation where the control channel of the base station is congested but some other channel may have extra capacity.

Another object of the invention is to allow the operation of the control channel when there has been interference on the control channel or the control channel has been interfered with and the system has changed the control channel, whereafter the control channel has again been interfered with. The method according to the invention aims at distributing the control channel operation during interference in such a way that one or more interfered radio channels will not prevent an efficient use of the system.

Still another object of the invention is to perform the change of an interfered radio channel and the control channel operation in such a way that any ongoing calls will be disturbed as little as possible.

This new method for allocating channels in a radio system is achieved by means of a method according to the invention which is characterized by the steps of allocating traffic channels for control channel use so as to distribute the control channel operation to a greater number of channels; indicating the channels allocated for control channel use to the subscriber stations; performing control channel operation in a distributed manner on the allocated control channels.

The invention also relates to a subscriber station in a radio system, comprising: a memory means, a transceiver, a controller for controlling the operation of the subscriber station. The subscriber station of the invention is characterized in that the memory means is arranged to store information contained in a control channel allocation message received by the subscriber station concerning channels on which the base station performs control channel operation with the subscriber station; and that the subscriber station further comprises means for causing the transceiver of the subscriber station to perform control channel operation on one or more channels indicated by the control channel allocation message.

The invention also relates to a base station comprising: a transceiver unit, a control unit for controlling the base station. The base station of the invention is characterized in that it further comprises: means for assembling a control channel allocation message indicating to the subscriber stations identities of distributed control channels on which the base station performs control channel operation with the subscriber station, and for transmitting the control channel allocation message to the desired subscriber station.

The invention is based on the idea that the control channel of a congested base station or a base station affected by interference in a radio system is distributed temporarily to several channels in such a way that one or more radio channels that are congested, contain interference or are affected by interference will not inhibit an efficient use of the radio system.

An advantage of this kind of methods for allocating channels in a radio system, a subscriber station in a radio system, and a radio system is that it solves the problems associated with the prior art systems.

The method according to the invention allows the signalling capacity to be increased in such a way that a radio telephone can start to transmit signalling on a predetermined traffic channel for a certain period of time under the control of the radio system.

By means of the method according to the invention, the capacity of the control channel of the base station can be increased by using the temporarily unused capacity of a traffic channel or any other capacity taken into use. The extension of the control channel need not increase the total number of channels.

The method according to the invention also allows subscriber stations to use the resources of the radio system during a high traffic density in a balanced way without loading any of the control channels excessively. The radio capacity of the system will thus be utilized more efficiently. At the same time, the method of the invention levels the load peaks of the system.

Still another advantage of the invention is that the method allows control channel operation in the radio system in a situation when there has been interference on the original control channel or the control channel has been affected by interference and the system has changed the control channel, after which the control channel has still been interfered with.

The invention also has the advantage that it allows the change of control channel and the control channel operation to be realized in such a way that any ongoing calls will be disturbed as little as possible.

BRIEF DESCRIPTION OF THE DRAWINGS

In the following the invention will be described more fully with reference to the attached drawings, in which:

FIGS. 6A and 6B are flow diagrams illustrating the operation of the base station according to the invention;

FIG. 7 illustrates a traffic interruption message according to the invention;

FIG. 9 is a flow diagram illustrating the operation of a subscriber station according to the invention when it is o a traffic channel.

DETAILED DESCRIPTION

This invention relates to a control channel signalling arrangement which provides reliable signalling when the control channel is affected by intentional or unintentional interference or when the control channel is overloaded. This invention is also concerned with eliminating or reducing the effects of narrow-band interference or interference affecting only a portion of the operating range. This kind of procedure is adequate for protecting modern radio systems, as transmission interfering with the entire frequency range have to be very strong, and so it will be technically easy to rapidly locate an interfering transmitter or interfering transmitters affecting the entire frequency range. The operation of a located source of interference can, of course, be eliminated rapidly.

As used in this document in connection with the invention, the term control channel refers to a radio frequency or in TDMA (Time Division Multiple Access) systems to a radio frequency and a time slot used for controlling the operation of the system, establishing calls between the base station and subscriber stations, transmitting data and short messages, and for base station changes performed by the subscriber stations (roaming).

Figure 1:
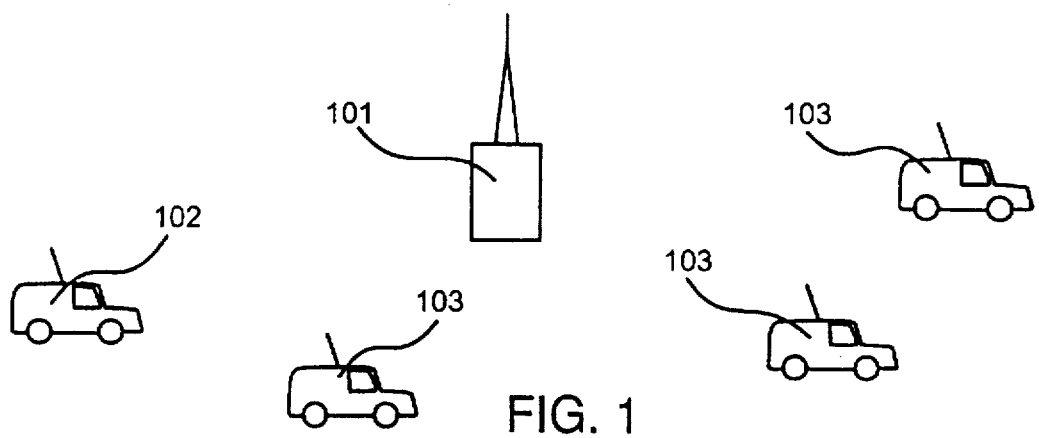
FIG. 1 illustrates a radio system to which the invention can be applied.

FIG. 1 illustrates a radio system where the invention can be applied. A typical radio system where the invention can be applied comprises at least one base station 101 and one or more mobile or fixed radio stations 102, 103, subscriber stations, as shown in FIG. 1. The radio stations 102, 103 communicate with each other via the base station. In addition, as there are often line connections from the base station to fixed subscriber stations, the exchange of a mobile radio system or other telecommunication networks, the radio stations may communicate with telecommunication equipment located within the coverage area of a base station that is not their dedicated base station.

Figure 2:
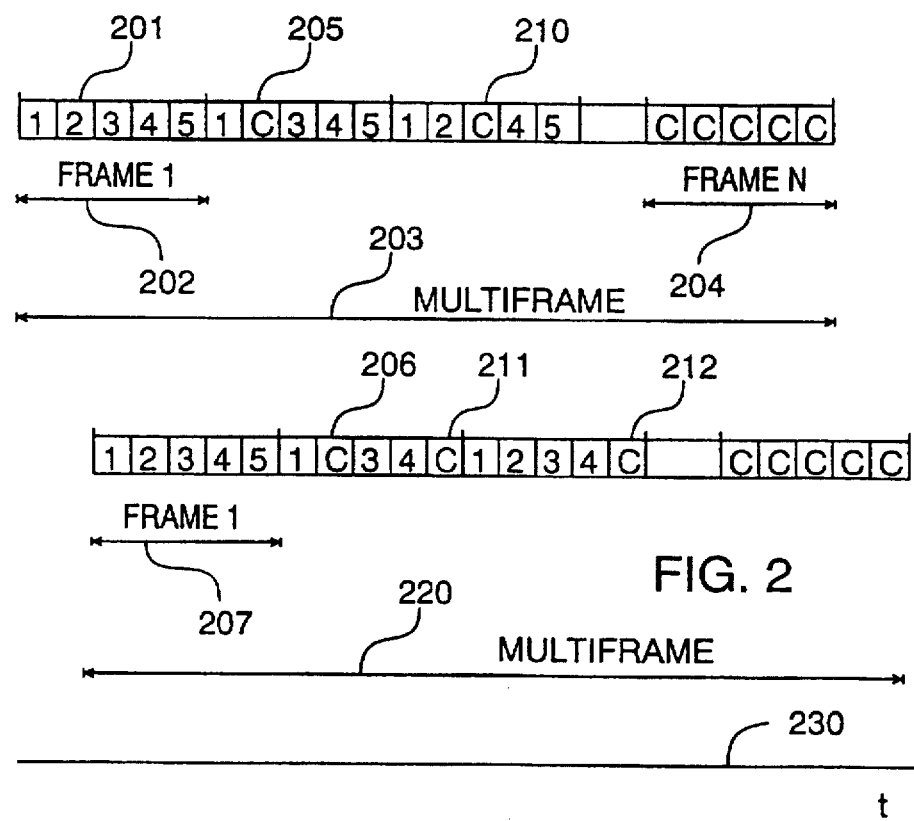
FIG. 2 illustrates channel allocation in the radio system.

FIG. 2 illustrates the frame structure of channels in the radio system on a traffic channel. The figure illustrates the division of one radio frequency into time slots and thus into radio channels. Each radio frequency may have one or more time slots 201, as shown in FIG. 2. It is, of course, also possible to implement the method and system according to the invention in the FDMA system, where the radio frequency has not been divided into time slots. In the example of FIG. 2, one frame 202 comprises 5 times slots. A predetermined number (N) of frames forms a multiframe 203. Besides the normal frames the multiframe may have a special signalling frame 204, the length of which may be equal to that of normal frames, as shown in the figure, or it may be smaller or greater, depending of the assumed signalling demand. Frame 204, i.e. frame number N, is one multiframe. It is permanently allocated for control channel use, which is indicated by letters C in its time slots. Frame number 2 contains the time slot 205 in the downlink direction, i.e. the base station transmits in this time slot. The time slot corresponding to this time slot is the time slot 206 in the uplink direction, i.e. the subscriber station transmits in time slot 206. According to the invention, this time slot pair 205, 206 is allocated for control channel use, even though it has previously been in traffic channel use. In addition, the base station uses the time slot 210 as a control channel in the downlink direction. Furthermore, the base station has allocated the time slots 211 and 212 to subscriber stations in the uplink direction for random access, for control channel use.

In the prior art solutions, the general control channel functions have been centralized e.g. in one signalling time slot 205, 206, C, which is available to the radio stations in accordance with the selected random access method. In the example of FIG. 2, the frame 202 transmitted by the base station and the frames 207 transmitted by the radio stations have been shifted in the time domain with respect to each other as shown in FIG. 2. FIG. 2 shows a time segment t. When the frame structure and transmission times of the base station and the subscriber station are compared with the time segment, it can be seen that the subscriber station always transmits after the base station. An individual radio station is thus able to receive, e.g., the signalling frame 205 and respond to it subsequently at a time 206. This allows the use of a simple radio device, which need not transmit and receive concurrently. A semiduplex radio device can thus be used. Of course, it is also possible to use a duplex radio device.

In the arrangement according to the invention, the system uses and allows subscribers to use all or predetermined radio channels or time slots for control channel operation, especially as a new control channel, particularly after an interference situation has been detected. During the interference situation, the control channel operation may remain completely or partly distributed. The same applies to a situation when the control channel operation is overloaded.

Control channel operations can be divided into two different needs. On one hand, the system attempts to page a specific radio station, e.g. for establishing an incoming call. On the other hand, an individual radio station wants to request resources from the system, e.g. for establishing an outgoing call. In the first case, from the viewpoint of the system, the system should know on which control channel the radio station to be paged is signalling. In the second case, it is nearly insignificant for the system over which control channel an individual radio station attempts to obtain system resources.

The operations of the method and base station and subscriber station according to the invention can be divided into two slightly different modes of operation, depending on the control channel operation which is affected by interference. The operation according to the invention will first be discussed in a situation when the reception of the control channel of the base station is affected by interference. In this situation, the base station usually detects the interference easily and is able to use its own transmitting frequency in a normal way for indicating a new two-way control channel or control time slot. In the more efficient interference-eluding method, i.e. in the method according to the present invention, the control channel operation is distributed in such a way that the radio stations are able to use at least the common control channel time slots 204 of TDMA systems as random access time slots. The base station may also increase the control channel capacity by indicating some or all of the unused radio channels and their portions as a control channel. In other words, free traffic channels are allocated for control channel use. When channels are allocated for control channel use, it is possible to scan the channels to see if the new channels to be allocated are free of interference. If this is not possible as all of the channels are in use or in order to obtain uniform distribution, the base station may "steal" i.e. temporarily reallocate part of the available traffic channel capacity for control channel use.

According to the invention, the base station may reallocate one or more time slots or time slot portions in traffic use for control channel use. In the transmission direction from the base station to the subscriber station, the base station changes the message name of the time slot into a desired control channel message name, e.g. into a control channel allocation message name and uses that portion of the time slot that it needs for forwarding the above-mentioned message. A subscriber station receiving traffic, such as voice, on the concerned channel detects from the message name that this speech time slot is not intended for it. The concerned subscriber station as well as subscriber stations waiting for control channel signalling on the concerned traffic channel detect on the basis of the message name that they save to interpret the content of the message and perform the required measures.

The base station may also allocate time slots for control channel use in the transmission direction from subscriber stations to the base station. If one of the subscriber stations is currently transmitting traffic, such as speech, the base station first commands the concerned subscriber station to interrupt the traffic by transmitting a traffic interruption message and then gives the transmission right to one or some of the subscriber stations in accordance with the used control channel protocol. Upon receiving the traffic interruption message, the subscriber station stops the transmission. Subscriber stations staying on the channel can use the released time slot or its portion, e.g. for transmitting a random access message. FIG. 7 shows one embodiment of the traffic interruption message. In the message shown in FIG. 7, traffic interruption and random access control are preferably combined so that the control channel capacity will be utilized efficiently. Of course, in the arrangement according to the invention, it is also possible to implement traffic interruption and random access control independently of each other.

In certain examples, for random access, the control channel is able to transmit random access algorithm data 355 to radio devices requesting access in control channel allocation messages. Data associated with the random access control can, of course, be transmitted in random access control messages distinct from control channel allocation messages. The control channel allocation message transmitted by the base station contains data on allowable radio channels and time slots as well as parameters for controlling the access attempts of different users.

In the arrangement according to the invention, the data of the control channel allocation messages or random access control messages are completed with data indicating which radio channels and time slots are available for the concerned radio channels for random access.

In a normal case, the probability of collision for those attempting random access is reduced by allocating a sufficiently long random access frame within which each radio selects randomly typically one time slot for the access attempt. An unsuccessful access attempt can be repeated in the next frame or during the validity period of a new control channel allocated after a predetermined waiting time. In the arrangement according to the invention, users are also distributed between the radio channels, so that the length of the access frame may be smaller than usual. The base station may divide the users among the radio channels on the basis of, e.g., the subscriber number, the group number or random access group number assigned to a subscriber station or a portion of such a number. In certain random access protocols, random access groups are used as short descriptions of, e.g., subscriber numbers, priority, etc., in the random access control of subscriber stations. The control channel operation of the base station can thus be distributed to several radio frequencies, and this may even be done irrespective of whether these frequencies are traffic channel frequencies or control channel frequencies. The base station simply reallocates some capacity for control channel use.

The base station, of course, allocates random access time slots, e.g. random access frames, primarily from currently unused channels. In addition, particularly in systems where the base station controls the transmission of each radio with an accuracy as high as one time slot, time slots are reallocated, i.e. "stolen", even from radio channels already in use.

Figure 3:
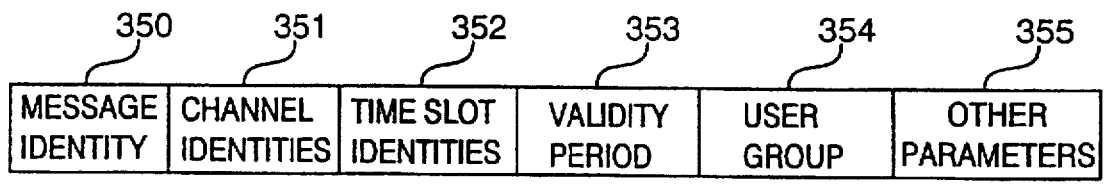
FIG. 3 illustrates a control channel allocation message according to the invention.

The actual random access control on the control channel established as described above takes place by means of control channel allocation messages transmitted by the system on the concerned original control channel or on traffic channels reallocated for control channel use. As is known, the random access protocol may contain a function which removes a random access time slot that has already been allocated after the control channel allocation message or random access control message has been transmitted. In the arrangement according to the invention, a permission to transmit signalling, such as speech, on a traffic channel can also be cancelled by transmitting traffic interruption messages, which makes it possible to allocate random access time slots even an traffic channels that are in use during traffic transmission. FIG. 3 shows a control channel allocation message section used for random access and traffic control and transmitted from the base station to radio stations.

The operation according to the invention will be described below in a situation where the transmission of a control channel of a base station is interfered with.

In this situation, subscribers' radio devices detect the interference, e.g. when no control channel of adequate quality can be found. The base station detects the situation, e.g. when there is a great number of unsuccessful subscriber paging attempts or when there are no random access attempts made by the subscribers or a substantially smaller number of such attempts. In the arrangement according to the invention, the base station starts to use some or all of the unused traffic channels as control channels. In addition, or particularly when all of the channels are in use, the base station allows all subscribers to use common radio-channel-specific control channel time slots. To increase capacity or to obtain uniform distribution, the base station may reallocate part of the traffic capacity in use for control channel use.

The control channel operation, particularly the existence of the distributed control channel, is indicated to radio devices in the same way as is above-described, by means of control channel allocation messages, which are transmitted by the system if required, preferably regularly, by using at least radio channels and time slots on which control channel operations are allowable. This control channel allocation message indicates on which channels, i.e. on which frequency or frequencies and in which time slots, the system attempts to page radio stations particularly for establishing calls. In order that the system does not need to transmit paging messages on all frequencies allocated for control channel use, the control channel allocation message contains information on the basis of which the radio stations start to use a predetermined radio frequency/channel or predetermined radio frequencies/channels e.g. according to the user group division or subscriber number. A combination of the above-described situations is also possible and will be described more closely with reference to FIGS. 6A and 6B.

FIG. 3 shows the control channel allocation message according to the invention. Field 350 is an identity field for the control channel allocation message. Field 351 is a field defining channels, i.e. radio channels or logical channel or radio channels which will be used as new temporary control channels. Field 352 indicates the time slots of the new control channel. Field 353 indicates the validity period of the new control channel, i.e. the time period during which the subscriber stations are able to communicate with the base station on that channel. This time period may be very short, i.e. fractions of a second, or it may be longer as well. The validity period may also be iterative, e.g. in such a way that the time periods granted to different channels do not substantially overlap, whereby an individual subscriber station is also able to utilize the control channel operation of several different channels. Field 354 indicates a user group, i.e. identifies subscribers that are to start to communicate on channels defined in the message, i.e. on certain frequencies and/or in certain time slots. Field 355 contains other possible parameters.

Figure 4:
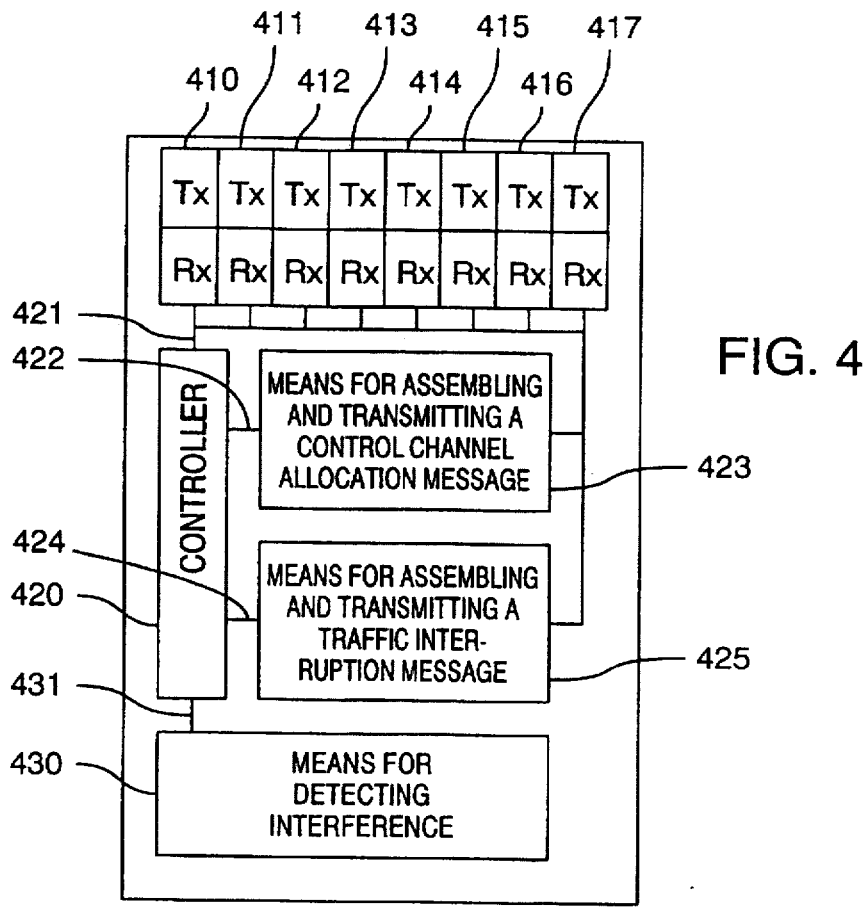
FIG. 4 is block diagram illustrating a base station according to the invention.

FIG. 4 is a block diagram illustrating a typical base station according to the invention. The base station comprises a number of transceivers 410, 411 412, 413, 414, 415, 416, 417 each having a transmitter section TX and a receiver section Rx. Each one of the transceivers is tuned to a specific channel pair in such a way that the transmitter Tx is tuned to a specific downlink frequency and the receiver Rx is tuned to a specific uplink frequency corresponding to the downlink frequency. There may be a regular duplex spacing between the downlink and uplink frequencies or the spacings may be determined in some other way, e.g. in such a way that the base station defines the channels or radio frequencies and the duplex spacing to be used by dynamically allocating according to the requirements. Of course, the radio transmitters may operate either analogically or digitally. The transceivers are connected to a base station controller 420 by means of a bus means 421 or the like. An interference detection means 430 is connected to the controller 420. A means 423 for assembling and transmitting a control channel allocation message and a means 425 for assembling and transmitting a traffic interruption message are also connected to the controller. The base station operates in such a way that when the interference detection means 430 detects interference, such as jamming, e.g. on one of the control channels of the base station, e.g. on a channel supported by the transceiver 410, it informs the controller 420 about this interference. The interference detection means 430 may also comprise a feature for measuring the load of the control channel and for detecting overload. In an interference or overload situation the controller 420 starts, in response to the interference detention means 430, the means 423 for assembling a control channel allocation message of desired kind on the basis of the instructions and command given by the controller. By means of the message, the controller may attempt to distribute the operation of the previous control channel in such a way that the transceivers 412 and 416, for instance, maintain the operation of the new temporary control channel. After the control channel allocation message has been assembled, it is forwarded via the bus means 421 to that one of the transceivers which transmits the assembled control channel allocation message at a desired time on desired channels, e.g. on the old control channel, which has been supported by the transceiver 410. Furthermore, if the base station has no free transceiver capacity., i.e. channel capacity, when interference occurs in the system, the controller 420 commands the means 425 for assembling and transmitting a traffic interruption message to assemble and transmit a traffic interruption message. The means 425 performs the above-mentioned measure and transmits the assembled message as described above to one of the transceiver units for the message to be forwarded to the subscriber stations.

Figure 5:
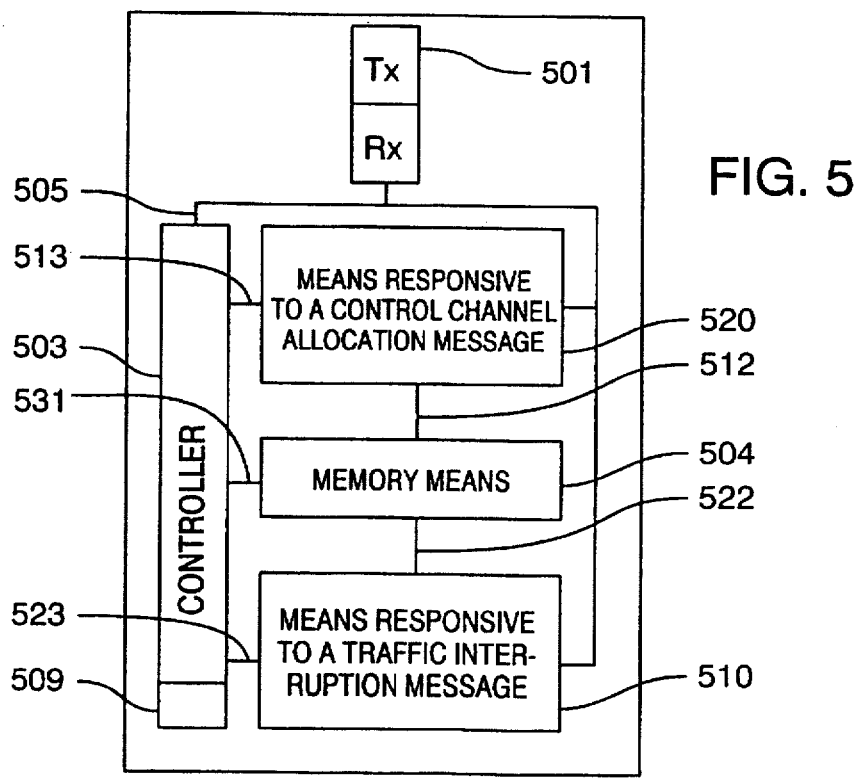
FIG. 5 is a block diagram illustrating a subscriber station according to the invention.

FIG. 5 is a block diagram illustrating a subscriber station according to the invention. The figure shows a typical subscriber station, i.e. the configuration of a radio telephone used by the subscriber. The function of the transceiver (TX/RX) 501 is to adapt to the radio channel used in each particular case. The radio channel may be the traffic or control channel of the base station of the radio system. The transceiver 501 has an associated antenna.

The function of the controller 503 is to control the operation of the subscriber station. The controller 503 is connected to the transceiver TX/RX by means of a bus means 505. The channel used by the transceiver is determined by the controller 503, i.e. the transceiver 501 is tuned to the channel i.e. radio frequency determined by the controller 503. The transceiver 501 is also switched on under the control of the controller 503. The controller 503 receives and transmits signalling messages by means of the transceiver 501.

The controller 503 has an associated memory means 504 containing permanent data and variable data. Permanent data include, e.g., the subscriber station's dedicated subscriber number, the numbers of groups which the subscriber station belongs to, and the radio channels belonging to the system. Variable data include the instantaneous state of the subscriber station, such as a rest state, a call establishment state, a speech state, etc., and e.g., information indicating the channel to which the station has been tuned. The memory means 504 of the subscriber station according to the invention is arranged to store data on channels on which the base station transmits control channel signalling, the data being contained in the control channel allocation messages received by the subscriber station. The memory means is also arranged to store the data contained in the traffic interruption message (FIG. 7) received by the subscriber station.

The subscriber station shown in FIG. 5 further comprises means 509 for tuning the transceiver 501 of the subscriber station for exchanging control channel signalling with the base station on channels indicated in the received control channel allocation message.

The subscriber station shown in FIG. 5 further comprises means 510 which, in response to the traffic interruption message (7) received by the subscriber station, temporarily interrupt the signalling of the subscriber station on the channel indicated by the traffic interruption message. It is possible to position both of the above-mentioned means (509 and 510) in the controller 503 of the radio unit, but they may also be positioned somewhere else in the radio unit.

The subscriber station shown in FIG. 5 further comprises a means 520 responsive to the control channel allocation message transmitted by the base station to the subscriber station. In response to the message, the means 520 stores in the memory means 504 the data contained in the control channel allocation message and controls the controller 503 so that it commands the subscriber station to switch to the channel indicated in the control channel allocation message of the transceiver 501 at a time indicated by this message.

Figure 6A:
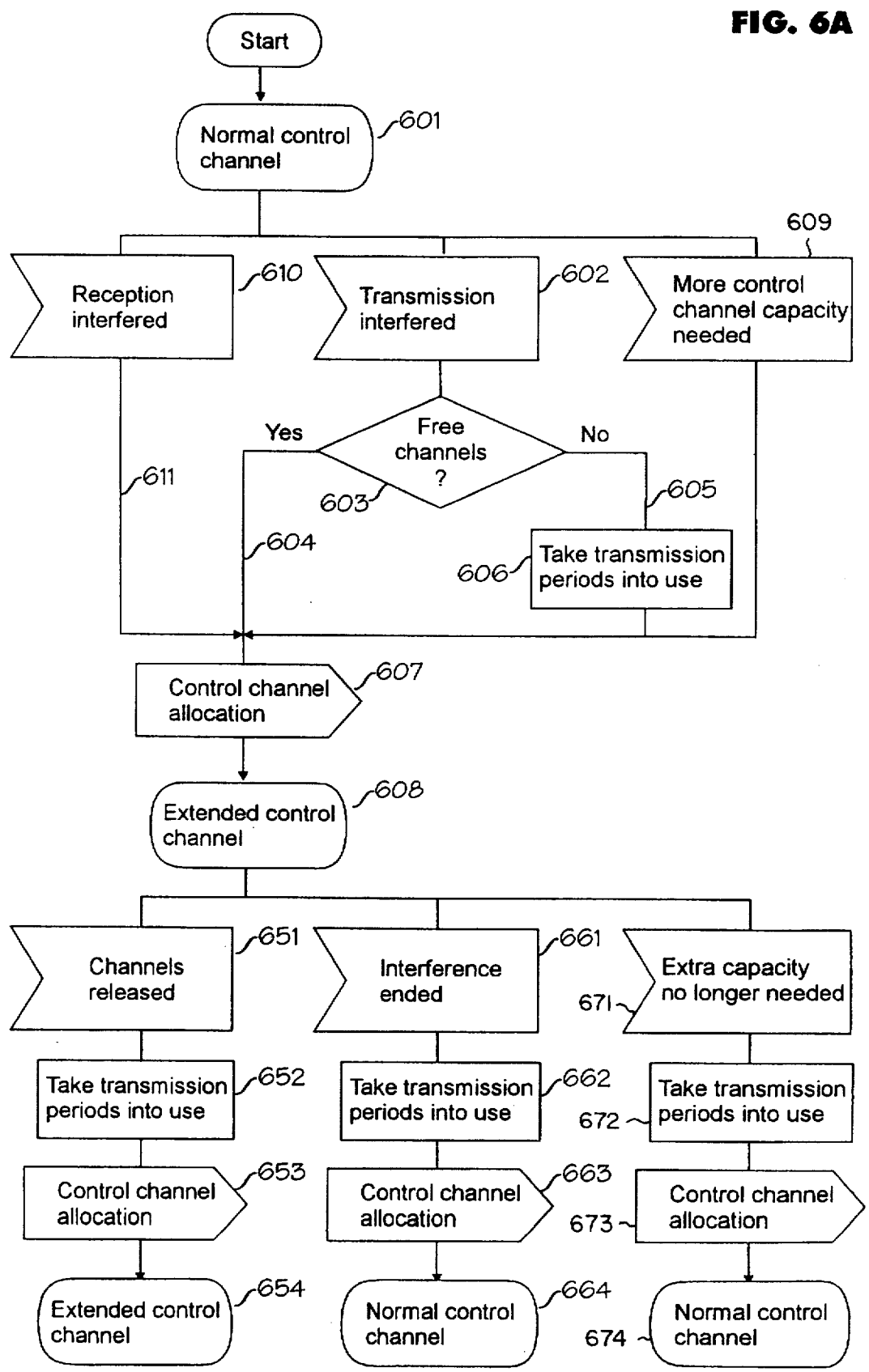

FIGS. 6A and 6B are flow diagrams illustrating the operation of the base station according to the invention. In FIG. 6A, it is assumed that there is no interference at the beginning of the operation of the base station, and the system is in a "Normal control channel" state 601. When the system detects that the reception is interfered with 610, the base station transmits control channel allocation messages 607 indicating to the radio channels which radio channels and time slots 351, 352 are available for control channel operation. At the same time the base station indicates on which radio channels and/or time slots the radio stations 354 should wait for messages addressed to them, such as incoming calls. As a result of the operation, the system enters into an "Extended control channel" state 608, 620. If all or most of the channels of the base station are in use, the base station reserves capacity in one or some of the traffic channels for random access and other control channel operation. If required 621, the base station allocates time slots or time slot portions 622 for its own signalling and transmits control channel allocation messages 623 indicating to the radio stations which radio channels and time slots are available, if required 631, the base station transmits random access control messages 632 to enable random access attempts by cancelling some of the previously granted transmission periods by a traffic interruption message 633. In the arrangement according to the invention, the random access control messages 632 and the traffic interruption messages may be combined messages as shown in FIG. 7 or fully separate messages or message portions.

When the system is in the "Extended control channel" state 620, it implements service requests 641 addressed to it by allocating transmission periods 642 for its own use and transmitting a message implementing the service, such as a connection establishment message. If the service request 641 is received, e.g. over the radio path in the form of a random access message and the transmission direction from the base station to the radio station is at the same time used by some other call, the base station takes one entire traffic time slot or a portion of the traffic time slot 642 from this call for signalling use by changing the name of the message of the time slot into the name of the required control channel signalling message 643 and transmits this message in place of the traffic time slot or its portion. The operation continues in the "Extended control channel" state 644.

If some of the traffic channels are released 651, the base station, if required, takes transmission periods 652 into use and informs the radio stations of the new allowable channels and time slots by means of the control channel allocation message 653. At the same time the traffic channel in control channel use may be released fully into traffic use. The operation continues in the "Extended control channel" state 654.

If the interference of the control channel disappears 661, the base station takes, if required, transmission periods 662 into use and informs the radio stations of the control channel or control channels by means of the allocation message 663, and normal operation 664, 601 is restored, i.e. the general control channel operation terminates on the traffic channels.

If the base station detects that its transmission is interfered with 602, it checks whether there are any free radio channels and/or time slots available. If a free channel or free channels are found, the base station starts to use them as control channels and indicates the new control channels by means of the control channel allocation message 607 and enters into the "Extended control channel" state. If there are no free channels available 605, the base station can start to use transmission periods 606 on suitable traffic channels as described above and indicates the new control channels by means of the control channel allocation message 607 and enters the "Extended control channel transmission" state.

If the base station needs more control channel capacity 609, the base station transmit, the control channel allocation message 607 and enters into the "Extended control channel" state 608. Correspondingly, when extended capacity is no longer needed 671, the base station takes, if required, transmission periods 672 into use and transmits the control channel allocation message 673 and switches to the normal control channel operation 674.

As is apparent to the reader, the operation described above covers the normal control channel operation only partially. This operation can also be easily implemented on the principles set forth above on traffic channels released for control channel use possibly only instanteously.

FIG. 7 shows a traffic interruption message according to the invention. The base station uses this message to control the transmitters of the subscriber stations during both traffic and control channel operation. Field 701 is the identity of a message indicating that the message is a traffic interruption message. Field 702 indicates whether the uplink channel has been allocated as a traffic channel or whether is it used for random access attempts during the following uplink time slot(s). Field 703 indicates the original users of a traffic channel, i.e to whom the traffic channel has been allocated for the time of the following uplink time slots(s) when the uplink channel is not used as a control channel and/or for random access attempts. The "owner" of the traffic channel, i.e. the subscriber station to which the channel has been allocated for traffic use, is able to transmit in accordance with the traffic channel protocol used in the system whenever the content of field 703 corresponds to the identity of the owner of the traffic channel. Field 704 is an interruption time field indicating the time for which the original traffic on the traffic channel has to be interrupted. In this arrangement, the base station indicates the traffic interruption for a specific subscriber either by setting the content of field 702 so as to indicate that the uplink channel is in random access use or so as to assign the traffic channel to someone else than its present owner. In the invention, traffic can also be interrupted in other ways, a typical feature of all of which is that the base station transmits an interruption indication which the subscriber station is able to identify during its own transmission or between its transmissions, e.g. at short transmission breaks. In the description of the present invention, all situations in which the transmission right of the owner of a traffic channel is cancelled, usually for a short period of time, are referred to as "traffic interruption message" transmission.

Figure 8:
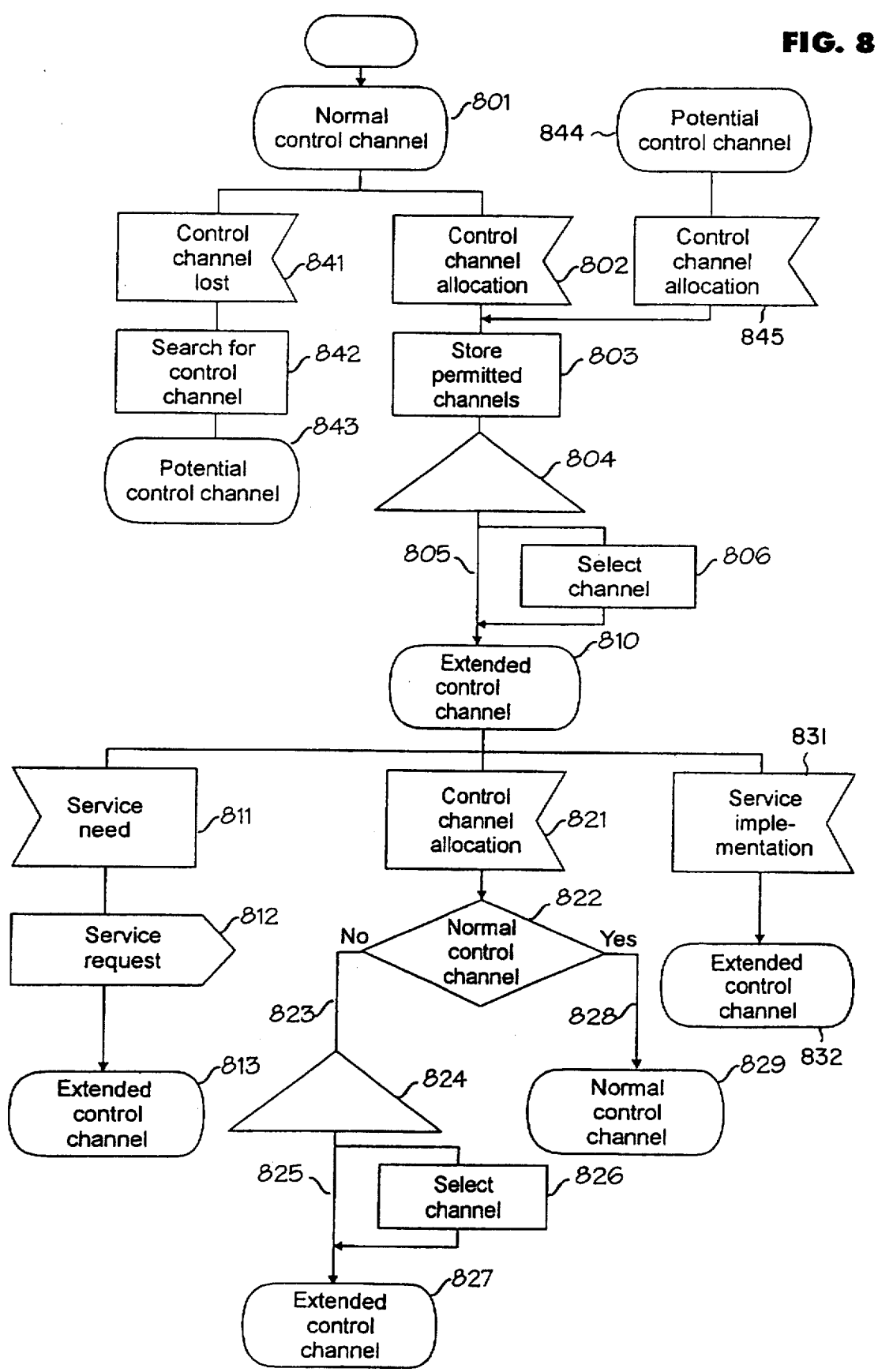
FIG. 8 is a flow diagram illustrating the operation of a subscriber station according to the invention when it is on a control channel.

FIG. 8 is a flow diagram illustrating the operation of a subscriber station according to the invention on a control channel. The operation starts from a "Normal control channel" state 801, in which the subscriber station receives a control channel allocation message 802 and stores the data contained in it FIG. 3) and possibly 804 selects a suitable control channel 806, if the control channel allocation message had a list of control channels, and enters into an "Extended control channel" state 810.

Particularly in an interference situation, the subscriber station may lose connection with the control channel 841 and start to search for a new control channel 842 and find a potential control channel, entering into a "Potential control channel" state 843. If the channel selected by the subscriber station is a control channel or a channel on which control channel data is transmitted, the subscriber station receives the control channel allocation message 845 in this state and stores the parameters 803 contained in it, whereafter the operation continues as described above When the subscriber station is in the "Extended control channel" stats 810, it may become necessary for the subscriber station to obtain service 811 from the base station, whereby it transmits a service request 812 such as a call establishment request to the base station in accordance with the random access protocol which the system utilizes, and still remains in the "Extended control channel" state 813. The subscriber station receives a response to this service request or some other implementation of the services such as a short message 831. This does not affect the state 832 of the subscriber station.

The subscriber station may further receive a new control channel allocation message 821, whereby it checks 822 whether the parameters of the message define a normal control channel, and if it is a normal control channel 828, it returns to normal control channel mode of operation 829. As described above, it is also possible 824 for the subscriber station to select 826 a new extended control channel 827.

As is apparent to the reader, the operation of the subscriber station has been described above mainly in situations according to the invention without describing any other control channel functions, which are also possible in the arrangement according to the invention when the system utilizes an extended control channel operation.

FIG. 9 illustrates operation according to the invention as regards a subscriber station when the subscriber station is on a traffic channel. In the invention, it is not significant how the subscriber station has been commanded or switched to the traffic channel. The description of the operation begins from a point of time when the subscriber station is on the traffic channel, i.e. in a "Traffic channel" state 901. In this state the subscriber station is able to receive a traffic termination message "Connection terminated" 911, whereby it searches 912 the stored date to find out whether normal control channel operation is being performed. If so 915, it enters a normal control channel 916. The subscriber station may receive a control channel allocation message 921 on the traffic channel and store 922 the data contained in the message for later use and remains in the "Traffic channel" state 923. The base station may also take part of the capacity of the traffic channel for control channel use, e.g. for random access attempts. The subscriber station detects this from the "Traffic interruption" message 931 and interrupts its traffic 932 for a time defined in the message or for some other known period, remaining in the "Traffic channel" state 933. It is apparent to the reader that the figure illustrates only the principal features of the operation of the traffic channel, using state definitions essential to the invention; in a more detailed traffic channel representation, such states would obviously be divided into several substates.

The drawings and the description related to them are only intended to illustrate the idea of the invention. In its details, the method according to the invention for allocating channels in a radio system, a subscriber station in a radio system, and a radio system may vary within the scope of the claims. The invention has been described above mainly with reference to trunking radio telephone systems, but it can also be used in other type of radio telephone systems, such as conventional mobile phone systems.

We claim:

1. A method for allocating control channels in a radio system comprising base stations and subscriber stations communicating with respective ones of the base stations over control channels and traffic channels, comprising the steps of:

allocating in response to detection of interference on the control channels of the system, traffic channels for control channel use so as to distribute the control channel operation to a greater number of channels in a distributed manner so that the control channel operation is distributed temporarily between the allocated channels;

indicating the channels allocated for control channel use to the subscriber stations by transmitting control channel allocation messages to the subscriber stations via the base stations, the control channel allocation messages containing identities of the channels allocated in a distributed manner;

receiving by the subscriber stations said control messages and storing the identities of said channels allocated in a distributed manner in memories of the subscriber stations; and performing control channel operation in a distributed manner on the distributed allocated control channels.

2. The method according to claim 1, wherein:
   said control channel allocation messages contain information indicating when the control channels allocated in a distributed manner are in control channel use, and the subscriber stations switch to the original or allocated channels in response to the information contained in the control channel allocation messages.

3. The method according to claim 1, further comprising:
   the channels to be allocated are scanned to check whether they contain interference before said channel are allocated in a distributed manner.

4. The method according to claim 1 wherein:
   in response to detection of interference on the control channels of the system, transmitting traffic interruption messages via the base stations so as to command desired subscriber stations to temporarily interrupt signalling on predetermined channels;

said subscriber stations interrupt signalling on said channels;

the system takes said channels into use and allocates them to the subscriber stations in a distributed manner for control channel use so that the control channel operation is distributed temporarily between all of the channels released for control channel use by transmitting control channel allocation messages to the subscriber stations via the base stations, the control channel allocation messages containing the identities of the channels allocated in a distributed manner; the subscriber stations receive said control channel allocation messages and store the identities of said channels allocated in a distributed manner in their memories; and the subscriber stations and the base station perform control channel operation on the channels allocated in a distributed manner.

5. Method according to claim 1, wherein
   said control channel allocation messages contain identities of the channels which have been allocated in a distributed manner and are used as temporary random access channels, or identities of the channels which have been allocated in a distributed manner and on which the subscriber stations are to temporarily listen to transmission from the base stations.

6. The method according to claim 1, wherein: temporary control channels are allocated arbitrarily on the basis of information known to both a respective base station and a respective subscriber station in such a way that both the system and the respective subscriber station know the identity of a temporary channel allocated to each one of the subscriber stations.

7. The method according to claim 6, wherein:
   said information known to both a respective base station and a respective subscriber station is the subscriber number of the respective subscriber station or a part of that subscriber number.

8. The method according to claim 6, wherein:
   said information known to both a respective base station and a respective subscriber station is the identity or a part of the identity of the group call group of the respective subscriber station.

9. A method according to claim 6, wherein:
   said information known to both a respective base station and a respective subscriber station is the number or a part of the number of the random access group of the respective subscriber station.

10. A method according to claim 1, wherein:
    temporary control channels are allocated arbitrarily in such a way that a list of potential temporary control channels is transmitted from a base station to respective ones of the subscriber stations, and the respective subscriber stations arbitrarily select one or more temporary control channels from the list for their own use.

11. The method according to claim 1, wherein:
    if more channels are released in the system, the system allocates new control channels to subscriber stations to which control channels were previously allocated by transmitting a control channel allocation message informing the respective subscriber stations of the identities of the new channels.

12. The method according to claim 1, wherein:
    the system returns to a normal state by transmitting control channel allocation messages to the subscriber stations, which start to perform control channel operation in response to said control channel allocation messages on the allocated channels.

13. A subscriber station comprising:

a memory means;

a transceiver;

a controller for controlling the operation of the subscriber station;

said memory means being arranged to store interference avoidance information contained in a control channel allocation message received by the subscriber station concerning channels on which a base station performs distributed control channel operation with the subscriber station, the subscriber station thus being arranged to avoid interference detected on some of the control channels of the base station; and means for causing the transceiver of the subscriber station to perform control channel operation in a distributed manner so that the control channel operation is distributed temporarily between the allocated channels indicated by the control channel allocation message, thus avoiding interference detected on some of the control channels of the base station.

14. The subscriber station according to claim 13, wherein:

said subscriber station further comprises means which are arranged to temporarily interrupt the signalling of the subscriber station in response to a traffic interruption message received by the subscriber station.

15. A base station for subscriber stations, comprising:

a transceiver unit;

a control unit for controlling the base station;

interference detecting means for detecting interference on control channels of the base station; and assembling means responsive to the interference detecting means for assembling a control channel allocation message indicating to the subscriber stations identities of distributed control channels on which the base station performs distributed control channel operation with desired ones of the subscriber stations, and for transmitting the control channel allocation message to the desired subscriber stations.

16. The base station according to claim 15, further comprising:

interruption means responsive to the interference detecting means for forming traffic interruption messages commanding the desired subscriber stations to temporarily interrupt signalling on predetermined channels, and transmitting said traffic interruption messages to the desired subscriber stations.

* * * * *